United States Patent
Li

(10) Patent No.: US 12,475,290 B2
(45) Date of Patent: Nov. 18, 2025

(54) HIGH-EFFICIENCY AND HIGH-PRECISION CHIP CIRCUIT SIMULATION VERIFICATION METHOD, SYSTEM AND APPARATUS AND STORAGE MEDIUM

(71) Applicant: BATELAB CO., LTD., Jiangsu (CN)

(72) Inventor: Zhen Li, Suzhou (CN)

(73) Assignee: BATELAB CO., LTD., Jiangsu (CN)

( * ) Notice: Subject to any disclaimer, the term of this patent is extended or adjusted under 35 U.S.C. 154(b) by 595 days.

(21) Appl. No.: 18/080,403

(22) Filed: Dec. 13, 2022

(65) Prior Publication Data
US 2023/0106980 A1 Apr. 6, 2023

Related U.S. Application Data

(63) Continuation of application No. PCT/CN2022/096643, filed on Jun. 1, 2022.

(30) Foreign Application Priority Data

Sep. 13, 2021 (CN) .......................... 202111065759.4

(51) Int. Cl.
*G06F 30/367* (2020.01)
*G06F 30/31* (2020.01)

(52) U.S. Cl.
CPC ............ *G06F 30/367* (2020.01); *G06F 30/31* (2020.01)

(58) Field of Classification Search
CPC ................................ G06F 30/367; G06F 30/31
See application file for complete search history.

(56) References Cited

U.S. PATENT DOCUMENTS

| | | | | |
|---|---|---|---|---|
| 7,721,090 B1 * | 5/2010 | Deepak | ................... | G06F 21/12 703/15 |
| 8,185,851 B2 * | 5/2012 | Kengeri | ................. | G06F 30/30 716/108 |
| 2022/0012398 A1 | 1/2022 | Nakamura et al. | | |

FOREIGN PATENT DOCUMENTS

| | | | |
|---|---|---|---|
| CN | 106485006 | A | 3/2017 |
| CN | 110428684 | A | 11/2019 |

(Continued)

OTHER PUBLICATIONS

Japan Patent Office (JPO); First Office Action of corresponding application JP2022-576196; Date: Dec. 21, 2023; with translation.

(Continued)

*Primary Examiner* — Nghia M Doan
(74) *Attorney, Agent, or Firm* — Taft Stettinius & Hollister LLP; Stephen F. Rost

(57) ABSTRACT

The present application discloses a high-efficiency and high-precision chip circuit simulation verification method, system and apparatus and a storage medium. The method includes: generating a virtual circuit structure in response to a circuit design instruction of a user on a visual page; converting the virtual circuit structure into a control signal conforming to a preset format condition; decoding the control signal by using a decoding method matched with the preset format condition, and generating a circuit regulating signal according to a decoding result; and transmitting the circuit regulating signal to a physical circuit generator with circuit components integrated therein to generate a physical circuit structure for performing a simulation verification operation by adjusting a connection relationship between components and nodes integrated therein based on the circuit regulating signal. The present application can effectively improve the efficiency of circuit simulation verification and improve the precision of the result of circuit simulation verification.

14 Claims, 5 Drawing Sheets

(56) References Cited

FOREIGN PATENT DOCUMENTS

| CN | 113378418 A | 9/2021 |
| CN | 113505556 A | 10/2021 |
| JP | H09198415 A | 7/1997 |
| WO | 2020194674 A1 | 10/2020 |

OTHER PUBLICATIONS

China National Intellectual Property Administration (ISA/CN), Beijing China; International Search Report and Written Opinion of the International application PCT/CN2022/096643, Mail Date: Aug. 8, 2022; pp. 7.

* cited by examiner

HIGH-EFFICIENCY AND HIGH-PRECISION CHIP CIRCUIT SIMULATION VERIFICATION METHOD, SYSTEM AND APPARATUS AND STORAGE MEDIUM

CROSS REFERENCE TO RELATED APPLICATIONS

The application is a U.S. national stage application under 35 U.S.C. § 371 of PCT International Application Serial No. PCT/CN2022/096643, filed Jun. 1, 2022, which claims priority to the Chinese Patent Application No. 202111065759.4, filed on Sep. 13, 2021, entitled "Visual Computer Aided Chip Design and Simulation Verification Method and System", the entire contents of which are incorporated herein by reference in their entirety.

TECHNICAL FIELD

The present application relates to the technical field of electronic digital data processing, and in particular to a high-efficiency and high-precision chip circuit simulation verification method, system and apparatus and a storage medium.

BACKGROUND

EDA (Electronic Design Automation) technology uses computers as tools. Designers use the hardware description language VHDL to complete design files on an EDA software platform, and then the computers automatically complete logic compilation, simplification, segmentation, synthesis, optimization, layout, routing and simulation, as well as adaptation compilation, logic mapping and programming download for specific target chips. the technology can greatly improve the efficiency and operability of circuit design, and reduce the labor intensity of designers. At present, in related technologies, the circuit is designed and simulated in EDA software.

In related technologies, the method for circuit simulation in the EDA software is as follows: firstly, the circuit is converted into a matrix, then the matrix is calculated in the simulation software, and finally the calculation result is output as the simulation result. However, if the simulation circuit is a complex circuit, because of the large amount of matrix data obtained by matrix conversion of the complex circuit, the calculation speed of the kind of matrix will be very slow in related technologies, and accordingly, the circuit simulation speed is also very slow. In addition, after all, the simulation result in the EDA software is calculated by the computer, and the computer can not completely simulate all the parameters existing in the actual situation in the calculation process, so there is a possibility of large errors between the calculated simulation result and the actual situation.

In view of the, how to improve the efficiency of circuit simulation verification and the precision of the circuit simulation verification result is a technical problem that the technical personnel in the field need to solve.

SUMMARY

The present application provides a high-efficiency and high-precision chip circuit simulation verification method, system, apparatus and a storage medium, which can effectively improve the efficiency of the circuit simulation verification and the precision of the circuit simulation verification result.

To solve the above technical problem, the embodiments of the present application provide the following technical solutions:

In a first aspect, an embodiment of the present application provides a chip circuit simulation verification method, including:

generating a virtual circuit structure in response to a circuit design instruction of a user on a visual page;

converting the virtual circuit structure into a control signal conforming to a preset format condition;

decoding the control signal by using a decoding method matched with the preset format condition, and generating a circuit regulating signal according to a decoding result; and transmitting the circuit regulating signal to generate a physical circuit structure for performing a simulation verification operation by adjusting a connection relationship between components and nodes in a physical circuit generator with circuit components integrated therein based on the circuit regulating signal.

Optionally, the step of generating the virtual circuit structure in response to the circuit design instruction of the user on the visual page includes:

creating a plurality of virtual components in the visual page in advance;

setting a component storage region in the visual page in advance and creating a component list in the component storage region to input each virtual component into the component list and set unique identification information for each virtual component at the same time;

in response to a component dragging instruction, dragging a target virtual component corresponding to the component dragging instruction from a storage location to a target location of the visual page; and connecting, in response to a connection relationship setting instruction, the corresponding virtual component to be connected according to the connection relationship instructed in the connection relationship setting instruction.

Optionally, the step of converting the virtual circuit structure into the control signal conforming to the preset format condition includes:

obtaining parameter information of each component in the virtual circuit structure;

generating a component connection relationship table based on the parameter information, a total number of nodes of the virtual circuit structure, and a connection relationship between pins of each component and nodes in the virtual circuit structure; and generating the control signal based on the component connection relationship table and a currently-used transmission protocol.

Accordingly, the process of decoding the control signal by using the decoding method matched with the preset format condition includes:

parsing the control signal to obtain the component connection relationship table; and taking the component connection relationship table as the decoding result.

Optionally, the physical circuit generator has a physical circuit grid integrated therein, the physical circuit grid includes various components and a plurality of nodes of a circuit, grid lines thereof are pin lines of the components or connection lines of the nodes, and grid intersections thereof are intersections of the pin lines of the components and the connection lines of the nodes; a non-volatile storage unit is pre-deployed on each grid intersection of the physical circuit grid, the physical circuit grid includes a plurality of lead-out pins having the same number as the nodes and having a one-to-one correspondence with the nodes, and wherein the step of generating the circuit regulating signal according to the decoding result includes:

obtaining information of components included in the virtual circuit structure, information of nodes included in the virtual circuit structure, and the connection relationship between the pins of each component and the nodes according to the decoding result;

generating a circuit grid control graph corresponding to the physical circuit grid based on the information of components, the information of nodes, and the connection relationship; and generating the circuit regulating signal according to intersections in the circuit grid control graph, so as to control whether a target transistor of the non-volatile storage unit deployed on each grid intersection of the physical circuit grid is to be set in an on-state or an off-state; the target transistor being a transistor connected to a pin of a component and a node of the physical circuit grid.

In a second aspect, an embodiment of the present application provides a chip circuit simulation verification system, including a host computer, a physical circuit generator, and a simulation verifier; wherein the host computer is configured to implement the steps of the chip circuit simulation verification method according to any one of claims 1 to 4 when executing a computer program stored in a storage unit;

the physical circuit generator have various circuit components integrated therein for generating a corresponding physical circuit structure based on a circuit regulating signal output by the host computer; and the simulation verifier is configured to perform simulation verification on the physical circuit structure and output a simulation verification result.

Optionally, the physical circuit generator has a physical circuit grid integrated therein;

the physical circuit grid is of a grid shape including various components and a plurality of nodes of a circuit, grid lines of the physical circuit grid are pin lines of the components or connection lines of the nodes, and grid intersections thereof are intersections of the pin lines of the components and the connection lines of the nodes; a non-volatile storage unit is deployed on each grid intersection of the physical circuit grid, and the physical circuit grid includes a plurality of lead-out pins having the same number as the nodes and having a one-to-one correspondence with the nodes.

Optionally, the non-volatile storage unit includes a first transistor, a second transistor and a third transistor;

the first transistor is connected to a tunneling electrode; the second transistor is connected to a control electrode; gate electrodes of the first transistor, the second transistor and the third transistor are all connected to a floating gate electrode; source electrodes and drain electrodes of the first transistor and the second transistor are connected to a substrate; the gate electrode and source electrode of the third transistor are not interconnected, and the gate electrode and source electrode of the third transistor are connected to each grid intersection.

Optionally, the third transistor is a P-LDMOS transistor or an N-JFET transistor;

when the third transistor is a P-LDMOS transistor: if it is determined that the third transistor of a present non-volatile storage unit deployed on a present grid intersection of the physical circuit grid is to be set in an on-state according to the circuit regulating signal, the physical circuit generator connects the control electrode of the present non-volatile storage unit to a high voltage VP terminal, and connects the tunneling electrode of the present non-volatile storage unit to a 0V terminal; if it is determined that the third transistor of the present non-volatile storage unit is to be set in an off-state according to the circuit regulating signal, the physical circuit generator connects the tunneling electrode of the present non-volatile storage unit to the high voltage VP terminal, and connects the control electrode of the present non-volatile storage unit to the 0V terminal; and when the third transistor is an N-JFET transistor: if it is determined that the third transistor of the present non-volatile storage unit deployed on the present grid intersection of the physical circuit grid is to be set in an on-state according to the circuit regulating signal, the physical circuit generator connects the tunneling electrode of the present non-volatile storage unit to a high voltage VP terminal, and connects the control electrode of the present non-volatile storage unit to a 0V terminal; if it is determined that the third transistor of the present non-volatile storage unit is to be set in an off-state according to the circuit regulating signal, the physical circuit generator connects the control electrode of the present non-volatile storage unit to the high voltage VP terminal, and connects the tunneling electrode of the present non-volatile storage unit to the 0V terminal.

Optionally, after the physical circuit generator is disconnected from the host computer and powered down, an input terminal, an output terminal and a target device of the simulation verifier are connected to corresponding lead-out pins of the physical circuit generator.

Optionally, multiple physical circuit generators are provided, the physical circuit generators are connected to each other by a module connection interface.

In a third aspect, an embodiment of the present application provides a chip circuit simulation verification apparatus, including:

a circuit diagram design module, configured to generate a virtual circuit structure in response to a circuit design instruction of a user on a visual page;

a control signal generating module, configured to convert the virtual circuit structure into a control signal conforming to a preset format condition;

a circuit regulating signal generating module, configured to decode the control signal by using a decoding method matched with the preset format condition, and generate a circuit regulating signal according to a decoding result; and a physical circuit generation and simulation module, configured to transmit the circuit regulating signal to generate a physical circuit structure for performing a simulation verification operation by adjusting a connection relationship between components and nodes in a physical circuit generator with circuit components integrated therein based on the circuit regulating signal.

Optionally, the circuit diagram design module is configured to:

create a plurality of virtual components in the visual page in advance;

set a component storage region in the visual page in advance and create a component list in the component storage region to input each virtual component into the component list and set unique identification information for each virtual component at the same time;

in response to a component dragging instruction, drag a target virtual component corresponding to the component dragging instruction from a storage location to a target location of the visual page; and connect, in response to a connection relationship setting instruction, the corresponding virtual component to be connected according to the connection relationship instructed in the connection relationship setting instruction.

Optionally, the control signal generating module is configured to:

obtain parameter information of each component in the virtual circuit structure;

generate a component connection relationship table based on the parameter information, a total number of nodes of the virtual circuit structure, and a connection relationship between pins of each component and nodes in the virtual circuit structure; and generate the control signal based on the component connection relationship table and a currently-used transmission protocol; and the circuit regulating signal generating module is configured to:

parse the control signal to obtain the component connection relationship table; and take the component connection relationship table as the decoding result.

Optionally, the physical circuit generator has a physical circuit grid integrated therein, the physical circuit grid includes various components and a plurality of nodes of a circuit, grid lines thereof are pin lines of the components or connection lines of the nodes, and grid intersections thereof are intersections of the pin lines of the components and the connection lines of the nodes; a non-volatile storage unit is pre-deployed on each grid intersection of the physical circuit grid, the physical circuit grid includes a plurality of lead-out pins having the same number as the nodes and having a one-to-one correspondence with the nodes;

the circuit regulating signal generating module is configured to:

obtain information of components included in the virtual circuit structure, information of nodes included in the virtual circuit structure, and the connection relationship between the pins of each component and the nodes according to the decoding result;

generate a circuit grid control graph corresponding to the physical circuit grid based on the information of components, the information of nodes, and the connection relationship; and generate the circuit regulating signal according to intersections in the circuit grid control graph so as to control whether a target transistor of the non-volatile storage unit deployed on each grid intersection of the physical circuit grid is to be set in an on-state or an off-state; the target transistor being a transistor connected to a pin of a component and a node of the physical circuit grid.

In a fourth aspect, an embodiment of the present application provides a computer-readable storage medium, having stored therein computer instructions for causing a computer to perform any one of the methods according to the first aspect of the present application. The advantage of the technical solution provided by the application is that first, the corresponding circuit structure design diagram is designed for the circuit that needs to be simulated and verified, the circuit structure design diagram is converted into a machine recognizable control signal, and the control signal is used to generate the circuit regulating signal of the physical circuit structure corresponding to the circuit design diagram by adjusting the connection relationship between components and nodes in the physical circuit generator. As the physical circuit generator integrates real circuit components, the physical circuit structure finally used for simulation verification is a simulation of the real circuit components without the need to perform matrix conversion, calculation and other processing operations, which can effectively improve the simulation verification speed and meet the real speed requirements of circuit simulation verification of any scale. As the circuit is composed of actual components, the simulation verification result fully conforms to the actual situation, which can effectively improve the precision of the circuit simulation verification result and ensure the precision of the final generated physical circuit structure.

In addition, the embodiments of the application also provide a corresponding implementation system for the chip circuit simulation verification method, further making the method more practical, and the system has corresponding advantages.

It should be understood that both the foregoing general description and the following detailed description are exemplary only and are not intended to limit the present disclosure.

BRIEF DESCRIPTION OF THE DRAWINGS

In order to illustrate the technical solutions of the present application embodiments or the related art more clearly, the accompanying drawings required to be used in the description of the embodiments or the related art will be briefly introduced below, it is obvious that the accompanying drawings in the following description are only some embodiments of the present application, and other drawings can be obtained according to these drawings for those of ordinary skill in the art without paying any creative effort.

DETAILED DESCRIPTION

In order to enable those skilled in the art to better understand the solutions of the application, the application is further described in detail below in combination with the drawings and specific embodiments. Obviously, the described embodiments are only part of the embodiments of the application, not all of them. Based on the embodiments in the application, all other embodiments obtained by those skilled in the art without doing creative work belong to the scope of protection in the application.

The terms "first", "second", "third", "fourth", etc. in the description and claims of the application and the above drawings are used to distinguish different objects, not to describe a specific order. In addition, the terms "including" and "having" and any deformation thereof are intended to cover non exclusive inclusion. For example, a process, method, system, product or equipment that contains a series of steps or units is not limited to the listed steps or units, but can include steps or units that are not listed.

After introducing the technical solutions of the embodiments of the present application, various non-limiting implementations of the present application are described in detail below.

Figure 1:
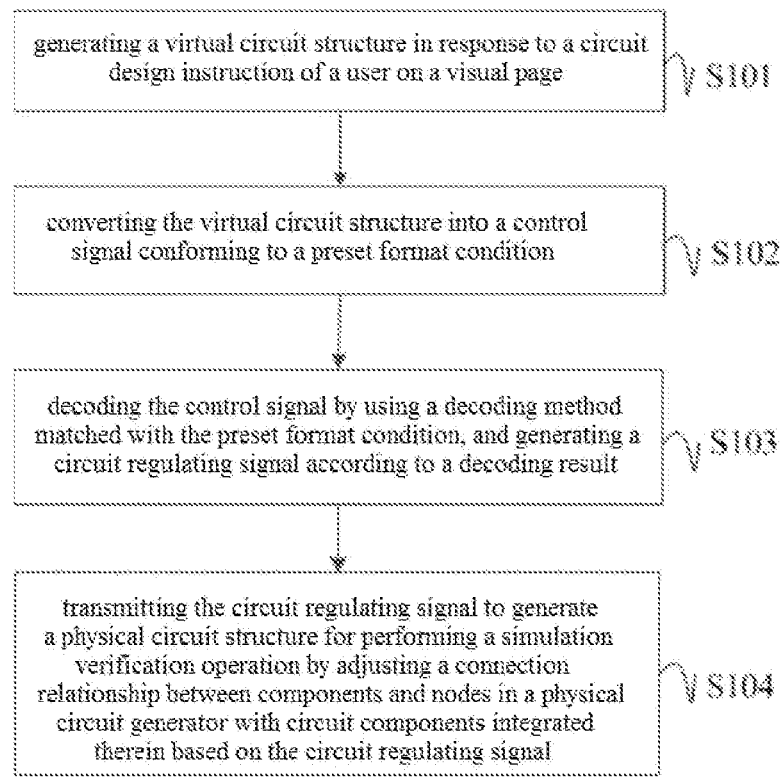
FIG. 1 is a flowchart illustrating a chip circuit simulation verification method according to an embodiment of the present application.

Referring first to FIG. 1, which is a flowchart illustrating a chip circuit simulation verification method according to an embodiment of the present application, the embodiment of the present application may include the following contents:

S101: a virtual circuit structure is generated in response to a circuit design instruction of a user on a visual page.

In the step, the virtual circuit structure is the circuit structure design diagram of the physical circuit that the user wants to carry out simulation verification. The embodiment can provide a man-machine interaction module for the user. The man-machine interaction module can include a display and a data input module, or a touchable display screen. The data input module can be, for example, a mouse or a keyboard. The display or the touchable display screen provides a visual page, and the user designs the circuit structure design diagram on the visual page through the man-machine interaction module. The system responds to the circuit design instruction of the user and generates the corresponding circuit design diagram, that is, the virtual circuit structure.

S102: the virtual circuit structure is converted into a control signal conforming to a preset format condition.

The control signal in the step refers to the signal that can be recognized by the system. The circuit design diagram generated in the previous step needs to be converted into machine recognizable information when the system processes the circuit structure of the virtual machine. The preset format condition is a data conversion format predetermined by those skilled in the art according to the software and hardware environment and parameters of the system. The application does not make any limitation on the, and the preset format condition is to enable the system to parse and acquire the data information contained in the virtual circuit structure.

S103: the control signal is decoded by using a decoding method matched with the preset format condition, and a circuit regulating signal is generated according to a decoding result.

It can be understood that after the data format conversion of the virtual circuit structure in the previous step, the system needs to decode the virtual circuit structure to obtain the corresponding data information, and the decoding method should match the preset format condition. Similarly, those skilled in the art can customize the corresponding decoding method according to the adopted preset format condition, and the decoding result is the data information contained in the virtual circuit structure, such as the type and parameter information of the circuit components included, the connection relationship between the circuit components and other basic parameter information of the circuit structure. The circuit regulating signal in the step is used to guide the generation of the physical circuit structure by using the basic parameter information of the circuit structure obtained by decoding.

S104: the circuit regulating signal is transmitted to generate a physical circuit structure for performing a simulation verification operation by adjusting a connection relationship between components and nodes in a physical circuit generator with circuit components integrated therein based on the circuit regulating signal.

In the embodiment, the physical circuit generator is integrated with real circuit components, such as the resistors, capacitors, triodes, etc., which can satisfy the construction of any type of circuit in any scale. The real circuit structure can be generated by adjusting the connection relationship between components and nodes integrated on the physical circuit generator, that is, the physical circuit structure is a circuit structure constructed by the real circuit components. The simulation verification is carried out after the arbitrary reconstruction of the integrated analog circuit structure. The simulation verification speed is extremely fast, and the simulation verification result obtained can ensure the maximum similarity with the actual operation result of the real circuit structure.

In the technical solution provided by the embodiment of the application, first, the corresponding circuit structure design diagram is designed for the circuit that needs to be simulated and verified, the circuit structure design diagram is converted into a machine recognizable control signal, and the control signal is used to generate the circuit regulating signal of the physical circuit structure corresponding to the circuit design diagram by adjusting the connection relationship between components and nodes in the physical circuit generator. As the physical circuit generator integrates real circuit components, the physical circuit structure finally used for simulation verification is a simulation of the real circuit components without the need to perform matrix conversion, calculation and other processing operations, which can effectively improve the simulation verification speed and meet the real speed requirements of circuit simulation verification of any scale. As the circuit is composed of actual components, the simulation verification result fully conforms to the actual situation, which can effectively improve the precision of the circuit simulation verification result and ensure the precision of the final generated physical circuit structure.

It should be noted that there is no strict order of execution among the steps in the application. As long as the logical order is met, these steps can be executed at the same time or in a preset order. FIG. 1 is only a schematic way, and does not mean that it can only be executed in the order.

In the above embodiment, there is no limit on how to execute step S101. The embodiment gives a generation way of a virtual circuit structure, which can include the following steps:

a plurality of virtual components are created in the visual page in advance. In response to a component dragging instruction, a target virtual component corresponding to the component dragging instruction is dragged from a storage location to a target location of the visual page; and in response to a connection relationship setting instruction, the corresponding virtual component to be connected is connected according to the connection relationship instructed in the connection relationship setting instruction.

In the present embodiment, the virtual components refer to the symbols in the circuit design diagram for the physical circuit components, and the virtual components commonly used for various circuits, such as resistors, capacitors, triodes, diodes, and MOS transistors, are created in advance in the system and stored under the target path. When a user designs the circuit structure diagram, a desired and already created virtual component can be dragged directly to the corresponding location, then, the connection relationship between the components is set by mouse scribing, and the virtual circuit structure is generated by generating node identifications at corresponding positions in response to a node setting instruction, thereby visually and quickly forming various circuit structures designed by developers and facilitating the users. In order to further enhance the user's experience, it is also possible to pre-create a number of commonly used segments capable of identifying the connection relationship. Of course, these segments are editable, so that they can also be dragged to the corresponding position by means of dragging. Parameters such as the length of the segments can be adjusted to meet the requirements if the segments are not appropriate.

In order to facilitate management and user usage, it is also possible to set a component storage region in the visual page in advance and create a component list in the component storage region to input each virtual component into the component list, and unique identification information can be set for each virtual component in order to facilitate user inquiry and management. The identification information can be used as index information for obtaining the corresponding virtual components by inputting the identification information into the search box, thereby improving the efficiency of generating the virtual circuit structure and improving the user's use experience without the need for the user to search one by one.

In the above embodiment, there is no limit on how to execute step S102, and one way of generating the control signal is given in the present embodiment, including the following steps:

parameter information of each component in the virtual circuit structure is obtained; a component connection relationship table is generated based on the parameter information, a total number of nodes of the virtual circuit structure, and a connection relationship between pins of each component and nodes in the virtual circuit structure; and the control signal is generated based on the component connection relationship table and a currently-used transmission protocol.

The parameter information of the components in the embodiment can include the component type, quantity, physical parameter value, etc. The component type includes the capacitor, resistor, or diode, etc. The physical parameter value refers to the resistance value or capacitance value, etc. A transportable protocol refers to the data transmission protocol used to transmit the control signal.

According to the present embodiment, on the basis of data conversion by using the preset format condition described above, the process of decoding the control signal by using the decoding method matched with the preset format condition includes: the control signal is parsed to obtain the component connection relationship table; and the component connection relationship table is taken as the decoding result.

Figure 2:
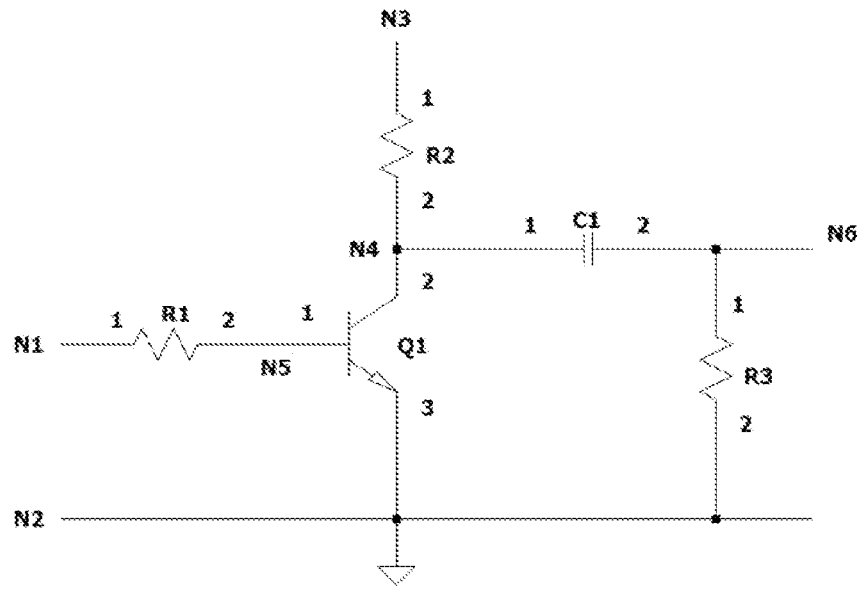
FIG. 2 is a structural schematic diagram illustrating a basic amplifier circuit of a triode in an exemplary application scenario provided by an embodiment of the present application.

In order to enable those skilled in the art to better understand the implementation method of the embodiment, the application also describes the process of how to convert the virtual circuit structure into a control signal that can be recognized by the system, and transmit the control signal to the corresponding functional module by taking the basic amplification circuit of the triode as an example in combination with FIG. 2. The embodiment is completed in the host computer, which includes a design module for performing the virtual circuit structure generation operation, a transmission module, and a control module for processing the control signal, and the following contents may be included:

A1: After the user clicks and saves the designed chip circuit structure in the design module, namely the virtual circuit structure, the virtual circuit structure is automatically saved to the transmission module.

A2: The transmission module reads the type and quantity of the components in the virtual circuit structure. As shown in FIG. 2, there are three types of components in the circuit, namely, the resistor, capacitor and triode, and there are three resistors, one capacitor and one triode. The parameter values of each circuit component in the virtual circuit structure, such as the resistance value and capacitance value, are the same as those of the components integrated in the physical circuit generator. In the actual design process, it is usually necessary to connect the resistor or capacitor integrated in the physical circuit generator in series and parallel to obtain the parameter values of each component in the virtual circuit structure, such as the resistance value and capacitance value.

A3: The transmission module reads the pins of each component, and marks each pin. As shown in FIG. 2, each of the resistor and capacitor in the circuit has two pins, which can be marked as 1 and 2, respectively. The triode has three pins, which can be marked as 1, 2 and 3.

A4: The transmission module reads the number of nodes in the virtual circuit structure and marks each node. As shown in FIG. 2, the number of nodes in the circuit is 6, which can be marked as N1, N2, N3, N4, N5 and N6 respectively.

A5: The transmission module reads the connection relationship between the pins of each component and the nodes, and generates the component connection relationship table shown in Table 1 below according to the connection relationship. The component connection relationship table can be in the form of taking the components as rows and the nodes as columns:

TABLE 1

Table of connection relationship between pins of each component and nodes

| | N1 | N2 | N3 | N4 | N5 | N6 | ... |
|---|---|---|---|---|---|---|---|
| R1 | 1 | 0 | 0 | 0 | 2 | 0 | ... |
| R2 | 0 | 0 | 1 | 2 | 0 | 0 | ... |

TABLE 1-continued

Table of connection relationship between
pins of each component and nodes

|  | N1 | N2 | N3 | N4 | N5 | N6 | ... |
|---|---|---|---|---|---|---|---|
| R3 | 0 | 2 | 0 | 0 | 0 | 1 | ... |
| ... | ... | ... | ... | ... | ... | ... | ... |
| C1 | 0 | 0 | 0 | 1 | 0 | 2 | ... |
| ... | ... | ... | ... | ... | ... | ... | ... |
| Q1 | 0 | 3 | 0 | 2 | 1 | 0 | ... |
| ... | ... | ... | ... | ... | ... | ... | ... |

A6: According to the component connection relation table generated in step A5 and the transmission protocol adopted by the transmission module, the transmission module generates the control signal recognizable by the corresponding control module and transmits the control signal to the control module. Correspondingly, after decoding the control signal transmitted from the transmission module, the component connection relationship table shown in Table 1 can be obtained.

It can be seen from the above that in the embodiment, the preset condition format is set to the table format, and the rows and columns of the table correspond to the nodes and components in the virtual circuit structure, so that the virtual circuit structure can be more intuitively and clearly reflected, which is convenient for identification and decoding, and is conducive to improving the circuit generation efficiency.

Figure 3:
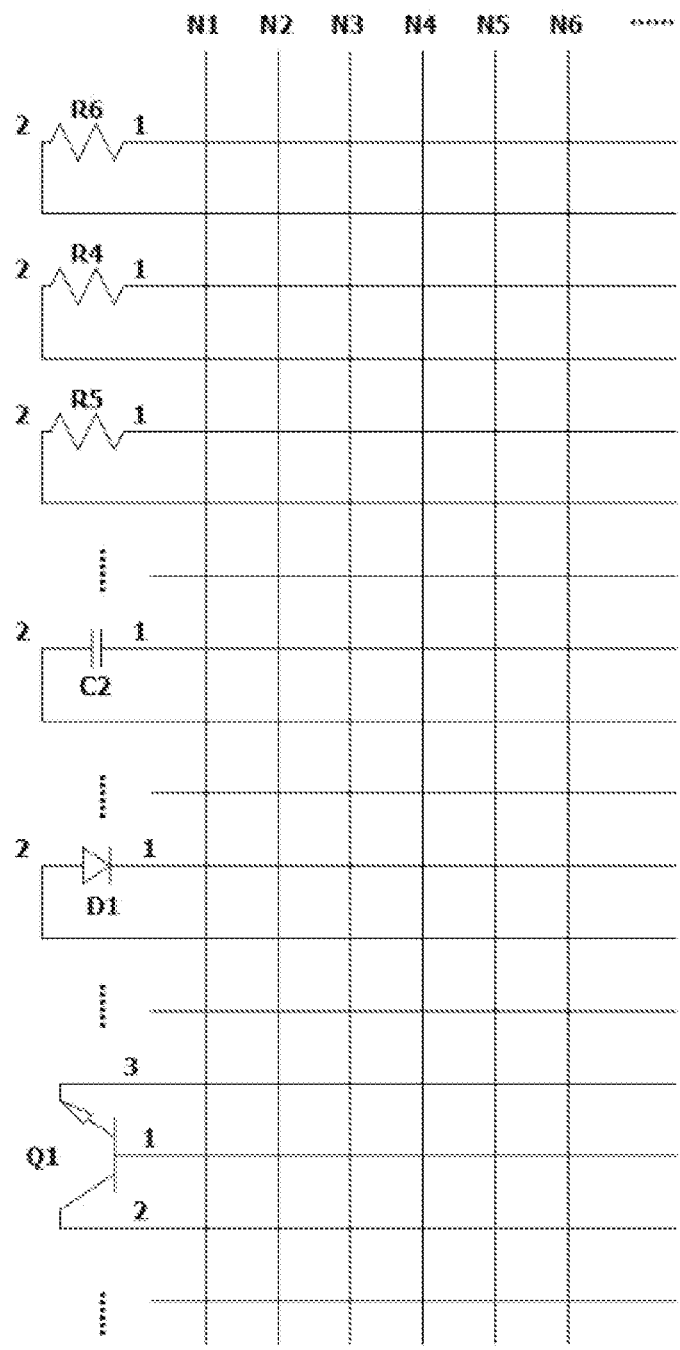
FIG. 3 is a schematic diagram illustrating a physical circuit grid in an exemplary application scenario provided by an embodiment of the present application.
Figure 4:
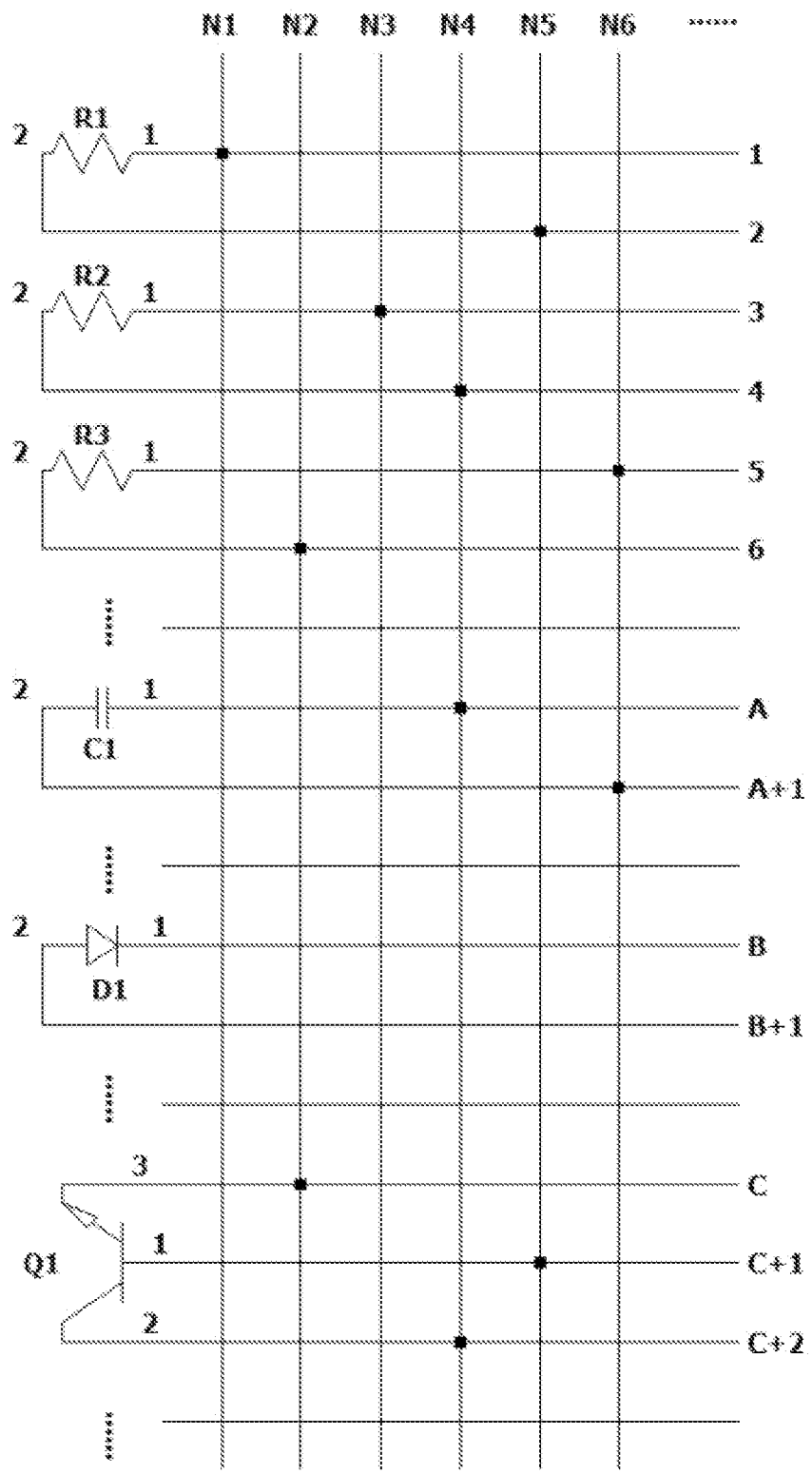
FIG. 4 is a schematic diagram illustrating a circuit grid control diagram in an exemplary application scenario provided by an embodiment of the present application.

In the above embodiment, there is no limit on how to execute step S103, and one way of generating the circuit regulating signal is given in the embodiment, including the following steps:

since the circuit regulating signal is used to direct the physical circuit generator to generate the physical circuit structure, the circuit regulating signal is generated in a manner consistent with the structure of the physical circuit generator. In the embodiment, the physical circuit generator has a physical circuit grid integrated therein, the physical circuit grid includes various components and a plurality of nodes of a circuit, grid lines thereof are pin lines of the components or connection lines of the nodes, and grid intersections thereof are intersections of the pin lines of the components and the connection lines of the nodes. A non-volatile storage unit is pre-deployed on each grid intersection of the physical circuit grid. The physical circuit generator of the embodiment can be a large integrated circuit chip, in which an N*M physical circuit grid as shown in FIG. 3 is integrated. The circuit grid contains several common circuit components of various types, such as, but not limited to, P1 resistors, P2 capacitors, T1 NPN transistors, T2 PNP transistors, T3 NMOS transistors, T4 PMOS transistors and T5 diodes, which ensures that the physical circuit generator can obtain a variety of circuit structures, and also guarantees that the physical circuit generator can generate various circuits of different sizes. The rows of the physical circuit grid can correspond to the various components involved in the circuit. Each row represents one component, and the corresponding column corresponds to each node in the circuit. One column corresponds to one circuit node. Accordingly, the horizontal grid lines of the physical circuit grid at the time represent the pin lines of the components, and the vertical grid lines represent the connecting lines of the circuit nodes. Of course, the rows of the physical circuit grid can also correspond to the nodes in the circuit, and the corresponding columns correspond to various components. Those skilled in the art can make flexible choices according to the actual situation, and the application does not make any limitation. Since there will be several nodes in the circuit, 100 or more nodes can be preset in the physical circuit grid. In order to facilitate the generation of the circuit regulating signal, the component connection relationship table in the above embodiment can have a one-to-one correspondence with the physical circuit grid, that is, the above table 1 can have a one-to-one correspondence with the circuit grid of N*M in FIG. 3. Therefore, even if the circuit only uses three resistors, one capacitor, one transistor and six nodes, the table still lists all the components and nodes that have been integrated in all the generating modules, therefore, there are many ellipses in Table 1. Since each of the circuits is composed of several components and nodes, it is only necessary to adjust the connection relationship between each component and each node to obtain various circuits. The non-volatile storage unit is used to store the state of each circuit grid intersection, that is, whether the component and node corresponding to the grid intersection have a connection relationship. Each non-volatile storage unit has a transistor connected to the pins of the components and the nodes. If the transistor is in the on-state, it indicates that the deployed node and component corresponding to the grid intersection have a connection relationship, as shown in FIG. 4, the black dot indicates that there is a connection relationship. If the transistor is in the off-state, it indicates that the deployed node and component corresponding to the grid intersection do not have a connection relationship.

Based on the specific structure of the physical circuit generator described above, the process of generating the circuit regulating signal according to the decoding result may include:

information of components included in the virtual circuit structure, information of nodes included in the virtual circuit structure, and the connection relationship between the pins of each component and the nodes are obtained according to the decoding result; a circuit grid control graph corresponding to the physical circuit grid is generated based on the information of components, the information of nodes, and the connection relationship, and the circuit grid control graph is shown in FIG. 4; and the circuit regulating signal is generated according to intersections in the circuit grid control graph, so as to control whether a target transistor of the non-volatile storage unit deployed on each grid intersection of the physical circuit grid is to be set in an on-state or an off-state; the target transistor being a transistor connected to a pin of a component and a node of the physical circuit grid.

The component information in the embodiment includes component type, number and physical parameter information, and node information can include the node number and node location. Taking FIG. 2 as an example, the decoding result of FIG. 2 is Table 1. According to Table 1 obtained from decoding, the first pin of R1 is connected to node N1, and the second pin of R1 is connected to node N5, etc. Based on the connection relationship between each component and the nodes, the circuit grid control diagram of NM shown in FIG. 4 is obtained. According to the circuit grid control diagram of N*M, the N1-1 intersection, N1-2 intersection, N3-3 intersection, N4-4 intersection, etc. in the grid need to be conducted, and the corresponding regulating signal can be generated according to the information that needs to be conducted.

In the embodiment, the physical circuit generator is set as a grid form composed of nodes and various types of components. Based on the physical circuit generator, the corresponding circuit regulating signal is generated. All kinds of circuits can be efficiently obtained by adjusting the connection relationship between the nodes and components, which is conducive to improving the simulation and verification efficiency of the physical circuit.

The embodiment of the application also provides a corresponding apparatus for the chip circuit simulation verification method, which further makes the method more practical. The apparatus can be described from either the perspective of a functional module or the perspective of hardware. The chip circuit simulation and verification apparatus provided by the embodiment of the application is described below, and the chip circuit simulation and verification apparatus described below and the chip circuit simulation and verification method described above can be referred to each other.

Figure 5:
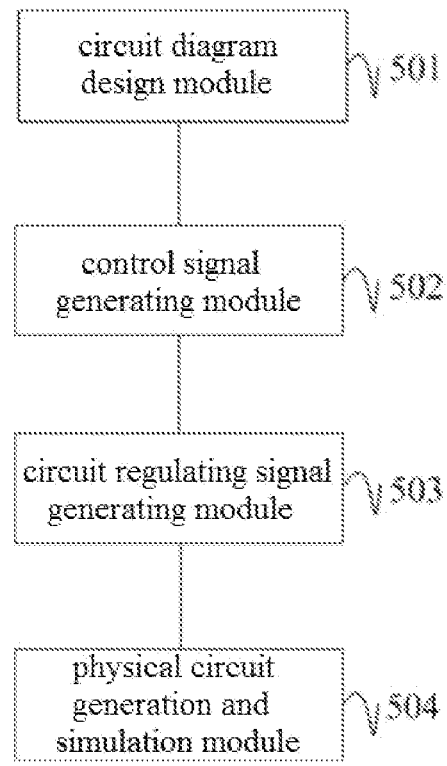
FIG. 5 is a structure diagram of a specific implementation of a chip circuit simulation verification apparatus provided by an embodiment of the present application.

From the perspective of the functional module, see FIG. 5. FIG. 5 is a structure diagram of a specific implementation of the chip circuit simulation verification apparatus provided by an embodiment of the application. The apparatus can include:

- a circuit diagram design module 501, configured to generate a virtual circuit structure in response to a circuit design instruction of a user on a visual page;
- a control signal generating module 502, configured to convert the virtual circuit structure into a control signal conforming to a preset format condition;
- a circuit regulating signal generating module 503, configured to decode the control signal by using a decoding method matched with the preset format condition, and generate a circuit regulating signal according to a decoding result; and
- a physical circuit generation and simulation module 504, configured to transmit the circuit regulating signal to generate a physical circuit structure for performing a simulation verification operation by adjusting a connection relationship between components and nodes in a physical circuit generator with circuit components integrated therein based on the circuit regulating signal.

Optionally, in some implementations of the embodiment, the circuit diagram design module 501 described above may be configured to: create a plurality of virtual components in the visual page in advance; set a component storage region in the visual page in advance and create a component list in the component storage region to input each virtual component into the component list and set unique identification information for each virtual component at the same time; in response to a component dragging instruction, drag a target virtual component corresponding to the component dragging instruction from a storage location to a target location of the visual page; and connect, in response to a connection relationship setting instruction, the corresponding virtual component to be connected according to the connection relationship instructed in the connection relationship setting instruction.

Optionally, in other implementations of the present embodiment, the control signal generating module 502 may be configured to: obtain parameter information of each component in the virtual circuit structure; generate a component connection relationship table based on the parameter information, a total number of nodes of the virtual circuit structure, and a connection relationship between pins of each component and nodes in the virtual circuit structure; and generate the control signal based on the component connection relationship table and a currently-used transmission protocol; and accordingly, the circuit regulating signal generating module 503 is configured to: parse the control signal to obtain the component connection relationship table; and take the component connection relationship table as the decoding result.

Optionally, in some other implementations of the embodiment, the physical circuit generator has a physical circuit grid integrated therein, the physical circuit grid includes various components and a plurality of nodes of a circuit, grid lines thereof are pin lines of the components or connection lines of the nodes, and grid intersections thereof are intersections of the pin lines of the components and the connection lines of the nodes; a non-volatile storage unit is pre-deployed on each grid intersection of the physical circuit grid, the physical circuit grid includes a plurality of lead-out pins having the same number as the nodes and having a one-to-one correspondence with the nodes; the circuit regulating signal generating module 503 is configured to obtain information of components included in the virtual circuit structure, information of nodes included in the virtual circuit structure, and the connection relationship between the pins of each component and the nodes according to the decoding result; generate a circuit grid control graph corresponding to the physical circuit grid based on the information of components, the information of nodes, and the connection relationship; and generate the circuit regulating signal according to intersections in the circuit grid control graph so as to control whether a target transistor of the non-volatile storage unit deployed on each grid intersection of the physical circuit grid is to be set in an on-state or an off-state; the target transistor being a transistor connected to a pin of a component and a node of the physical circuit grid.

Figure 6:
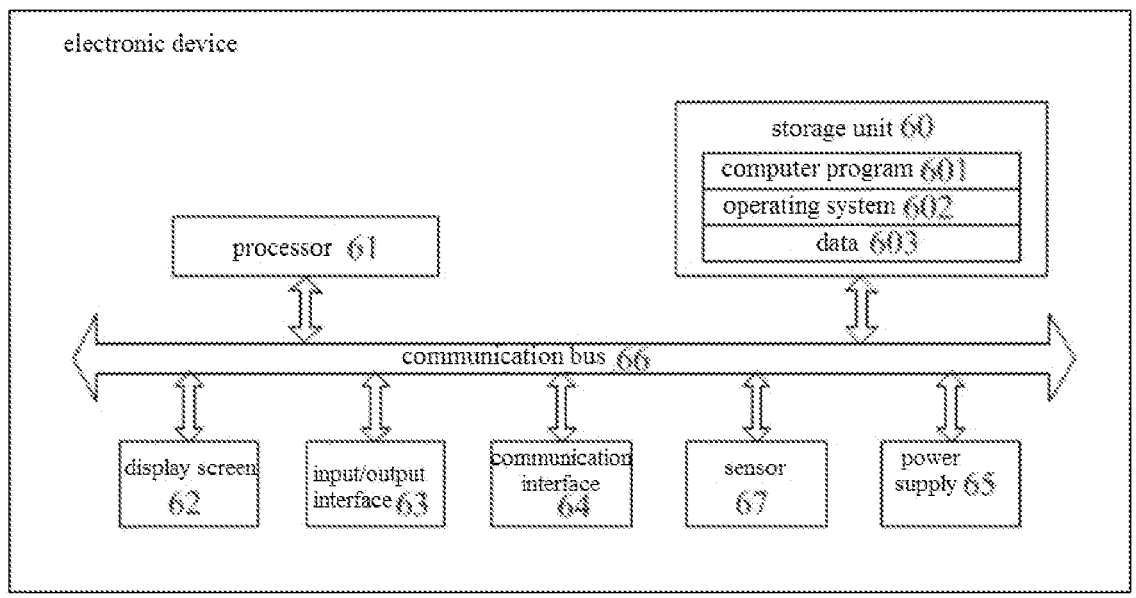
FIG. 6 is a structure diagram of a specific implementation of an electronic device provided by an embodiment of the present application.

The chip circuit simulation verification apparatus referred to above is described in terms of a functional module. Further, the present application also provides an electronic device that is described in terms of hardware. FIG. 6 is a structure diagram of a specific implementation of an electronic device provided by an embodiment of the application. As shown in FIG. 6, the electronic device includes a storage unit 60 for storing a computer program; and a processor 61 for implementing the steps of the chip circuit simulation verification method as mentioned in any one of the above embodiments when executing the computer program.

The processor 61 may include one or more processing cores, such as a 4-core processor, and an 8-core processor, the processor 61 may also be a controller, a microcontroller, a microprocessor or other data processing chips, or the like. The processor 61 may be implemented in a hardware form of at least one of DSP (Digital Signal Processing), FPGA (Field-Programmable GateArray), and PLA (Programmable Logic Array). The processor 61 may also include a main processor and a co-processor, the main processor is a processor for processing data in an awake state, also referred to as a CPU (Central Processing Unit); the co-processor is a low-power processor for processing data in a standby state. In some embodiments, the processor 61 may be integrated with a GPU (Graphics Processing Unit) which is used to render and draw the content to be displayed on the display screen. In some embodiments, the processor 61 may also include an AI (Artificial Intelligence) processor for processing computational operations related to machine learning.

The storage unit 60 may include one or more computer-readable storage media, which may be non-transitory. The storage unit 60 may also include a high-speed random access storage unit as well as a non-volatile storage unit, such as one or more magnetic disk storage devices, flash storage devices. The storage unit 60 may in some embodiments be an internal storage unit of the electronic device, for example a hard disk of a server. The storage unit 60 may also be an external storage device of the electronic device in other embodiments, such as a plug-in hard disk equipped on a server, a SMC (Smart Media Card), a SD (Secure Digital) card, a Flash Card, or the like. Optionally, the storage unit 60 may also include both an internal storage unit and an external storage device of the electronic device. The storage unit 60 may be used not only for storing application software and various types of data installed in the electronic device, such as codes of programs that execute vulnerability processing methods, but also for temporarily storing data that has been output or is to be output. In the embodiment, the storage unit 60 is configured to store at least the following computer program 601, which, after being loaded and executed by the processor 61, executes the relevant steps of the chip circuit simulation verification method disclosed in any one of the preceding embodiments. In addition, the resources stored by the storage unit 60 may also include an operating system 602 and data 603, and the storage mode can be temporary storage or permanent storage. The operating system 602 can include Windows, Unix, Linux, etc. The data 603 may include, but is not limited to, data corresponding to the simulation and verification results of the chip circuit.

In some embodiments, the above electronic device may also include a display screen 62, an input/output interface 63, a communication interface 64 (or referred to as a network interface), a power supply 65, and a communication bus 66. Among them, the display screen 62 and input/output interface 63, such as the keyboard, belong to the user interface, and the optional user interfaces can also include a standard wired interface, a standard wireless interface, etc. Optionally, in some embodiments, the display may be an LED display, a liquid crystal display, a touch type liquid crystal display, an OLED (Organic Light-Emitting Diode) touch device, or the like. The display can also be appropriately called the display screen or display unit, which is used to display the information processed in the electronic device and display the visual user interface. The communication interface 64 may optionally include a wired interface and/or a wireless interface, such as a WI-FI interface, a Bluetooth interface, etc., which is usually used to establish a communication connection between the electronic device and other electronic devices. The communication bus 66 can be a peripheral component interconnect (PCI) bus or an extended industry standard architecture (EISA) bus. The bus can be divided into an address bus, a data bus, a control bus, etc. For ease of representation, FIG. 6 only uses a thick line, but it does not mean that there is only one bus or one type of buses.

Those skilled in the art can understand that the structure shown in FIG. 6 does not constitute a limitation of the electronic device, and can include more or fewer components than shown in the figure, for example, can also include a sensor 67 that realizes various functions.

The functions of each functional module of the electronic device or chip circuit simulation verification apparatus in the above embodiment can be specifically implemented according to the method in the above method embodiment. The specific implementation process can refer to the relevant description of the above method embodiment, and will not be repeated here.

It can be seen from the above that the embodiment of the application can effectively improve the efficiency of circuit simulation and verification, and improve the precision of the circuit simulation and verification result.

It can be understood that if the chip circuit simulation verification method in the above embodiment is implemented in the form of a software functional unit and sold or used as an independent product, it can be stored in a computer readable storage medium. Based on the understanding, the technical solution of the application, in essence, or the part that contributes to the prior art, or the whole or part of the technical solution, can be embodied in the form of a software product. The computer software product is stored in a storage medium and executes all or part of the steps of the methods of various embodiments of the application. The aforementioned storage medium includes a U disk, a removable hard disk, a Read-Only Memory (ROM), a Random Access Memory (RAM), an electrically erasable programmable ROM, a register, a hard disk, a multimedia card, a card-type memory (such as SD or DX memory, etc.), a magnetic memory, a removable magnetic disk, a CD-ROM, a magnetic disk or an optical disk, and any other medium capable of storing program codes.

Based on the, an embodiment of the present application further provides a computer-readable storage medium having stored therein computer instructions for causing a computer to execute the steps of the chip circuit simulation verification method in any one of the above embodiments.

Figure 7:
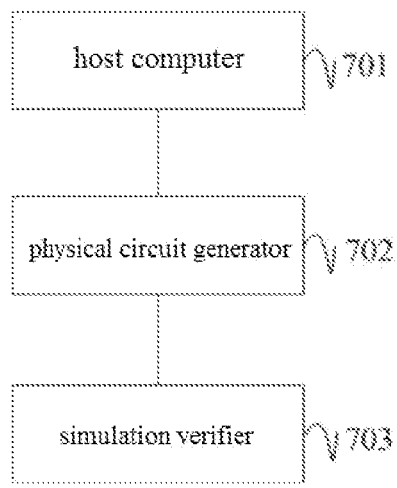
FIG. 7 is a structure diagram of a specific implementation of a chip circuit simulation verification system provided by an embodiment of the present application.

The embodiment of the present application also provides a chip circuit simulation verification system, see FIG. 7, which may include an host computer 701, a physical circuit generator 702, and a simulation verifier 703.

In the embodiment, the host computer 701 is configured to implement the steps of the chip circuit simulation verification method according to any one of the above-mentioned embodiments when executing a computer program stored in a storage unit, and the host computer 701 sends the circuit regulating signal to the physical circuit generator 702 outside the host computer 701 through a communication transmission interface.

The physical circuit generator 702 have various circuit components integrated therein for generating a corresponding physical circuit structure based on a circuit regulating signal output by the host computer 701. As one optional implementation of the present embodiment, the physical circuit generator 702 has a physical circuit grid integrated therein, the physical circuit grid includes various components and a plurality of nodes of a circuit, grid lines thereof are pin lines of the components or connection lines of the nodes, and grid intersections thereof are intersections of the pin lines of the components and the connection lines of the nodes; a non-volatile storage unit is pre-deployed on each grid intersection of the physical circuit grid, the physical circuit grid includes a plurality of lead-out pins having the same number as the nodes and having a one-to-one correspondence with the nodes, and is connected with the simulation verifier 703 via the lead-out pins so as to realize the simulation verification of the physical circuit structure. Correspondingly, the physical circuit generator 702 has an addressing module integrated therein; the addressing module receives the circuit regulating signal sent by a communication receiving interface of the host computer 701, and addresses and regulates all the non-volatile storage units corresponding to the intersections integrated in the module according to the circuit regulating signal, thus obtaining the circuit structure designed by the host computer 701.

In the embodiment, the simulation verifier 703 is used to simulate and verify the physical circuit structure and output the simulation verification result. The simulation verifier 703 may include an input signal access terminal, namely, an input terminal, an output signal access terminal, namely, an output terminal, a power supply terminal, a ground terminal, and a target device which may be a measuring instrument or a display instrument. After generating the physical circuit structure, the physical circuit generator 702 is placed in the simulation verifier 703 for simulation verification after being disconnected from the host computer 701. After the physical circuit generator 702 is disconnected from the host computer 701 and powered off, the input terminal, the output terminal and the target device of the simulation verifier 703 are connected to the corresponding lead-out pins of the physical circuit generator 702. Since the physical circuit generator 702 uses the non-volatile storage unit, after the physical circuit generator 702 is disconnected from the host computer 701 and powered off, the state of the non-volatile storage unit will not change, that is, after the power is off, the physical circuit structure generated by the physical circuit generator 702 will not change, and will always remain the circuit structure designed by the host computer. According to the actual simulation verification scenario, the nodes connected to the input terminal, the output terminal, the target device and the power supply terminal are selected from the physical circuit structure. Taking FIG. 3 as an example, the nodes N1 and N3 can be connected to the input terminal of the simulation verifier as the input signal access terminal, the node N2 can be grounded, the node N6 can be connected to the target device such as a measuring instrument or a display instrument, and the nodes N4 and N5 are intermediate nodes, and can also be used to connect the measuring instrument or the display instrument. Then, after the physical circuit generator 702 is successfully connected with the lead-out pins corresponding to the nodes of the circuit grid and the input power supply, the ground or the target device in the simulation verifier, the simulation output data or waveform data can be directly obtained through the measuring instrument or the display instrument, so that the correctness of the circuit designed by the host computer can be quickly verified.

The functions of each functional module of the chip circuit simulation verification system in the embodiment of the application can be specifically implemented according to the method in the above method embodiment, and the specific implementation process can refer to the relevant description of the above method embodiment, which will not be repeated here.

It can be seen from the above that the embodiment can effectively improve the efficiency of circuit simulation and verification, and improve the precision of the circuit simulation and verification result.

The above embodiments do not define the structure of the non-volatile storage unit. Based on the above embodiments, the application also provides the structure of the non-volatile storage unit in a specific embodiment, which can include the following contents:

the non-volatile storage unit may include a first transistor, a second transistor and a third transistor; the first transistor and the second transistor, for example, may be PMOS (P-channel Metal Oxide Semiconductor) transistors. The first transistor is connected to a tunneling electrode; the second transistor is connected to a control electrode; gate electrodes of the first transistor, the second transistor and the third transistor are all connected to a floating gate electrode; source electrodes and drain electrodes of the first transistor and the second transistor are connected to a substrate. If the source electrode and the gate electrode of the third transistor are connected, the direction of current flowing through the third transistor and the voltage direction of the drain and source electrodes are fixed, while the two terminals of the third transistor are connected with the component pin and the circuit node respectively. The voltage and current directions between the component pin and the circuit node are uncertain or variable, so the source electrode and the gate electrode of the third transistor should be designed not to be connected, the third transistor is formed into a fully symmetrical structure, so that when the pressure difference between the gate electrode and the substrate meets the requirements, its current can flow from the drain electrode to the source electrode, or from the source electrode to the drain electrode. In addition, since both terminals of the third transistor need to be connected with high-voltage devices or high-voltage nodes, in order to achieve independent control of the pressure difference between the gate electrode and the substrate, the pressure difference is not affected by the source electrode voltage, thus enabling the switching on and off of a switch tube. Therefore, the source electrode of the third transistor is not connected to the gate electrode, and the gate electrode and the source electrode of the third transistor are connected to each grid intersection.

Figure 8:
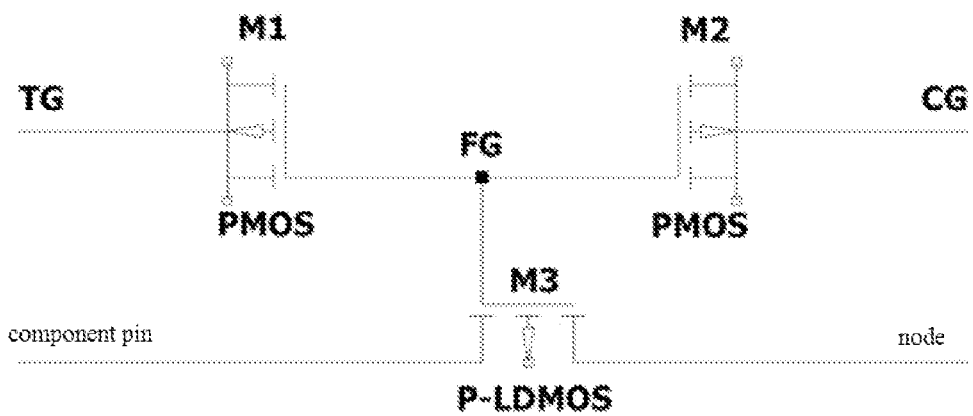
FIG. 8 is a schematic diagram of a circuit structure of a non-volatile storage unit in an exemplary application scenario provided by an embodiment of the present application.

As shown in FIG. 8, as an optional implementation of the non-volatile storage unit, the first transistor M1 is a tunneling tube, the second transistor M2 is a control tube, and the third transistor M3 is a switch tube. Both the M1 and M2 are PMOS transistors, and the drain and source electrodes of the M1 and M2 are connected to the substrate. In the embodiment, because the two terminals of the third transistor are connected with analog components, and some analog devices inevitably need to use a high voltage, while the switch tubes in ordinary non-volatile storage units are low voltage MOS transistors, which cannot withstand the high voltage in the analog circuit, therefore, the embodiment selects the LDMOS transistors to solve the technical disadvantage. Based on this, the M3 can be a P-LDMOS transistor (silicon microwave power transistor) whose source electrode is not connected to the gate electrode. The source and drain electrodes of the M3 are connected to each circuit grid intersection. Specifically, the source and drain electrodes of the M3 can be connected to the component pin and the node respectively. For example, the first pin of the R1 and the node N1 are respectively connected to the source and drain electrodes of the M3 of the non-volatile storage unit at the N1-1 intersection, and the first pin of the R1 and the node N2 are respectively connected to the source and drain electrodes of the M3 of the non-volatile storage unit at the N2-1 intersection.

Based on the structure of the non-volatile storage unit shown in FIG. 8, the working state of the non-volatile storage unit can be:

if the third transistor is in an on-state: the CG terminal is connected to a high-voltage VP, the TG terminal is connected to 0V, at the time, there will be a large forward voltage drop on the tunneling tube M1, electrons will tunnel through the gate oxide layer from the channel below the gate oxide layer of the M1, and be stored in a polysilicon gate, and the FG terminal is stored as "1". During the process, the potential on the FG will continuously decrease, therefore, the forward voltage on the M1 will continue to drop, and finally it is not enough to tunnel, so that the FG terminal is kept to be stored as "1". At the time, there are a number of electrons on the polysilicon gate, which make the electrons near the gate electrode in the N-type substrate of the PMOS transistor repelled, and holes are attracted. The attracted holes make the drain and source electrodes of the M3 conducted, i.e. the M3 is conducted, and the component pins are connected with the nodes. If the third transistor is in the off-state: the TG terminal is connected to the high-voltage VP, and the CG terminal is connected to the 0V. At the time, there will be a large reverse voltage drop on the tunneling tube M1. The electrons will tunnel through the gate oxide layer from the polysilicon gate, and be drawn out to a well region of the M1. The node FG is stored as "0". During the process, the potential on the FG will continue to rise, so the reverse voltage on the M1 will continue to drop, and finally, it will not be enough to tunnel, so that the FG terminal is kept to be stored as "0". At the time, the polysilicon gate does not store electrons, and no conductive hole can be formed between the drain and source electrodes of the M3, which makes the drain and source electrodes of the M3 disconnected, i.e. the M3 is turned off, and the component pins are disconnected with the nodes.

Based on the working state of the non-volatile storage unit, if the third transistor of the current non-volatile storage unit deployed on the current grid intersection of the physical circuit grid is determined to be in the on-state according to the circuit regulating signal, then the control electrode of the current non-volatile storage unit is connected to the high-voltage VP terminal, and the tunneling electrode of the current non-volatile storage unit is connected to the 0V terminal; if the third transistor of the current non-volatile storage unit deployed on the current grid intersection of the physical circuit grid is determined to be in the off-state according to the circuit regulating signal, the tunneling electrode of the current non-volatile storage unit is connected to the high-voltage VP terminal, and the control electrode of the current non-volatile storage unit is connected to the 0V terminal.

Accordingly, based on the structure of the physical circuit generator 702, the circuit regulating signal can be generated in such a way that whether the third transistor of the non-volatile storage unit deployed in the physical circuit grid of the physical circuit generator 702 is in the on-state or off-state is determined according to whether the intersection in the circuit grid control diagram is the target intersection. The regulating signal of the CG terminal of the first type of target non-volatile storage unit in the on-state is set to be connected to the high-voltage VP, and the regulating signal of the TG terminal is set to be connected to the 0V. The regulating signal of the CG terminal of the second type of target non-volatile storage unit in the off-state is set to be connected to the 0V, and the regulating signal of the TG terminal is set to be connected to the high-voltage VP. The target intersection means that the component and node corresponding to the intersection are connected. The first type of target non-volatile storage unit is the non-volatile storage unit with the third transistor in the on-state, and the second type of target non-volatile storage unit is the non-volatile storage unit with the third transistor in the off-state. Taking FIG. 2 as an example, the regulating signal at the CG terminal of the non-volatile storage unit corresponding to the intersection that needs to be conducted, such as the N1-1 intersection, the N1-2 intersection, the N3-3 intersection, or the N4-4 intersection, is designed to be connected to the high-voltage VP, the regulating signal at the TG terminal is designed to be connected to the 0V, and the regulating signal at the TG terminal of any one of the other non-volatile storage units is designed to be connected to the high-voltage VP, and the regulating signal at the CG terminal is designed to be connected to the 0V.

Figure 9:
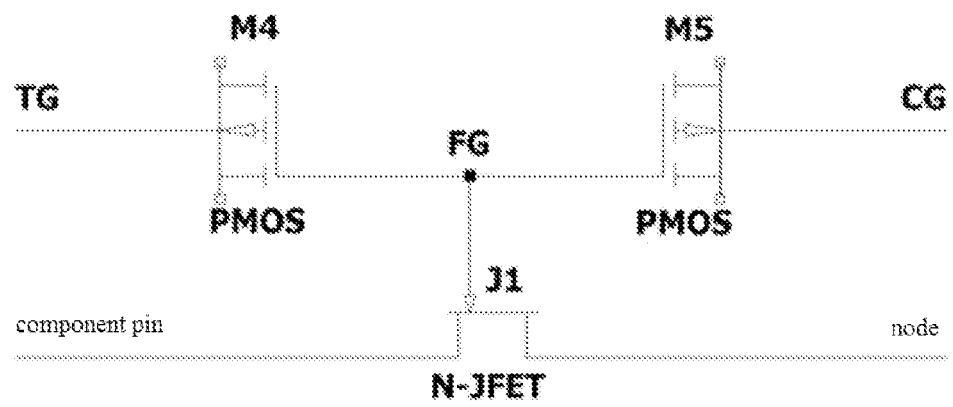
FIG. 9 is a schematic diagram of a circuit structure of a non-volatile storage unit in another exemplary application scenario provided by an embodiment of the present application.

As shown in FIG. 9, as a parallel implementation with the above embodiment, the first transistor M4 is a tunneling tube, the second transistor M5 is a control tube, and the third transistor J1 is a switch tube. The M4 and M5 can both be P-LDMOS transistors (P-type laterally diffused metal oxide semiconductor transistors), and the drain and source electrodes of the M4 and M5 are connected with the substrate. Because the third transistor needs to be a transistor with a fully symmetrical structure, which can withstand the high voltage and whose source electrode is not connected to the gate electrode, the current can flow from the drain electrode to the source electrode, or from the source electrode to the drain electrode. Considering that the source electrode and the drain electrode of the N-JFET transistor are in the N region and the gate electrode is in the P region, no matter how large the voltage connected with the source electrode and the drain electrode is, there will be no path between the drain electrode or the source electrode and the gate electrode. In addition, the source electrode and the gate electrode of the N-JFET transistor are not connected, and the N-JFET transistor is a completely symmetrical structure, the current thereof can flow from the drain electrode to the source electrode, or from the source electrode to the drain electrode. Therefore, the third transistor can be N-JFET transistor (N-type junction field-effect transistor). The source electrode and the drain electrode of J1 can be connected to the each circuit grid intersection. Specifically, the source electrode and the drain electrode of J1 are respectively connected to the component spin and the node. For example, the first pin of R1 and the node N1 are respectively connected to the source electrode and the drain electrode of J1 of the non-volatile memory at the N1-1 intersection, and the first pin of R1 and the node N2 are respectively connected to the source electrode and the drain electrode of J1 of the non-volatile storage unit at the N2-1 intersection. Based on the structure of the non-volatile storage unit shown in FIG. 9, the working state of the non-volatile storage unit can be:

if the third transistor is in an on-state: the TG terminal is connected to the high-voltage VP, the CG terminal is connected to 0V, at the time, there will be a large reverse voltage drop on the tunneling tube M4, the electrons will tunnel through the gate oxide layer from the polysilicon gate, and drawn to a well region of the M4, and the node FG is stored as "0". During the process, the potential on the FG will continuously increase, therefore, the reverse voltage on the M4 will continue to drop, and finally it is not enough to tunnel, so that the FG terminal is kept to be stored as "0". At the time, there are no electrons on the polysilicon gate, since both the drain electrode and the source electrode of J1 are N-type regions, the drain electrode and the source electrode of J1 are conducted through the N-type conductive channel between the drain electrode and the source electrode, i.e. the J1 is conducted, and the component pins are connected with the nodes. If the third transistor is in the off-state: the CG terminal is connected to the high-voltage VP, and the TG terminal is connected to the 0V. At the time, there will be a large forward voltage drop on the tunneling tube M4. The electrons will tunnel through the gate oxide layer from the tunnel below the polysilicon gate of M4, and stored in the polysilicon gate. The FG terminal is stored as "1". During the process, the potential on the FG will continue to decrease, so the forward voltage on the M4 will continue to drop, and finally, it will not be enough to tunnel, so that the FG terminal is kept to be stored as "1". At the time, there are a number of electrons on the polysilicon gate. These electrons repel the electrons near the gate electrode in the N-type conductive channel of J1, and attract holes. The attracted holes block the N-type conductive channel to make the N-type conductive channel unable to conduct the electrons, thus causing the drain electrode and the source electrode of J1 to be disconnected, i.e. J1 is turned off, and the component pin is disconnected from the node.

Based on the working state of the non-volatile storage unit, if the third transistor of the current non-volatile storage unit deployed on the current grid intersection of the physical circuit grid is determined to be in the on-state according to the circuit regulating signal, then the tunneling electrode of the current non-volatile storage unit is connected to the high-voltage VP terminal, and the control electrode of the current non-volatile storage unit is connected to the 0V terminal; if the third transistor of the current non-volatile storage unit is determined to be in the off-state according to the circuit regulating signal, the control electrode of the current non-volatile storage unit is connected to the high-voltage VP terminal, and the tunneling electrode of the current non-volatile storage unit is connected to the 0V terminal.

Accordingly, based on the structure of the physical circuit generator 702, the circuit regulating signal can be generated in such a way that whether the third transistor of the non-volatile storage unit deployed in the physical circuit grid of the physical circuit generator 702 is in the on-state or off-state is determined according to whether the intersection in the circuit grid control diagram is the target intersection. The regulating signal of the CG terminal of the first type of target non-volatile storage unit in the on-state is set to be connected to the 0V, and the regulating signal of the TG terminal is set to be connected to the high-voltage VP. The regulating signal of the CG terminal of the second type of target non-volatile storage unit in the off-state is set to be connected to the high-voltage VP, and the regulating signal of the TG terminal is set to be connected to the 0V. Taking FIG. 2 as an example, the regulating signal at the TG terminal of the non-volatile storage unit corresponding to the intersection that needs to be conducted, such as the N1-1 intersection, the N1-2 intersection, the N3-3 intersection, or the N4-4 intersection, is designed to be connected to the high-voltage VP, the regulating signal at the CG terminal is designed to be connected to the 0V, and the regulating signal at the CG terminal of any one of the other non-volatile storage units is designed to be connected to the high-voltage, and the regulating signal at the CG terminal is designed to be connected to the 0V.

It can be seen from the above that the non-volatile storage unit of the physical circuit generator 702 in the embodiment realizes circuit reconstruction. After the power is cut off, the circuit structure in the physical circuit generator 702 remains unchanged and remains the circuit structure designed by the host computer, so that the physical circuit generator 702 can be separated from the host computer for simulation verification at any time. At the same time, when the physical circuit generator 702 is simulated and verified, it is not necessary to burn the physical circuit generator 702 every time after power on to generate the circuit that needs to be simulated and verified, which can effectively improve the efficiency of circuit simulation and verification and enhance the user experience. According to the characteristics of the analog circuit, the switch tube of the non-volatile storage unit is designed as a switch tube that can withstand the high voltage, and the non-volatile storage unit is controlled with the corresponding control method, which realizes the arbitrary reconstruction of the analog circuit without considering the withstand voltage and the direction of current and voltage. The embodiment provides a variety of non-volatile storage unit structures with better flexibility and practicability, which is conducive to improving the user experience.

It can be understood that, because the number of circuit components in the physical circuit generator 702 is limited, when the circuit structure is large, the physical circuit generator 702 may not be able to realize the construction of the entire large circuit. In order to meet the simulation verification of large-scale circuits and improve practicality, the application, based on the above embodiments, can also include:

the chip circuit simulation and verification system can include multiple physical circuit generators 702 with the same structure. Each physical circuit generator 702 is connected through the module connection interface, so that the circuit structure of any scale can be obtained, and then the circuit structures of various scales can be simulated and verified.

In the specification, each embodiment is described in a progressive manner. Each embodiment focuses on the differences with other embodiments. The same or similar parts of each embodiment can be referred to each other. As for the hardware including the apparatus and the electric device disclosed in the embodiments, the description is relatively simple because they correspond to the methods disclosed in the embodiments. Please refer to the description of the method section for details.

Those skilled can further realize that the units and algorithm steps of each example described in combination with the embodiments disclosed herein can be realized by electronic hardware, computer software or a combination of both. In order to clearly explain the interchangeability of hardware and software, the composition and steps of each example have been generally described in the above description according to functions. Whether these functions are implemented in hardware or software depends on the specific application and design constraints of the technical solution. Those skilled can use different methods for each specific application to realize the described functions, but such implementation should not be considered beyond the scope of the application.

The chip circuit simulation verification method, system, apparatus and storage medium provided in the application are described in detail above. In the application, specific examples are used to explain the principles and implementations of the application. The above examples are only used to help understand the method and core idea of the application. It should be pointed out that for those skilled in the technical field, without departing from the principles of the application, a number of improvements and modifications can be made to the application, which also fall within the protection scope of the claims of the application.

What is claimed is:

1. A chip circuit simulation verification method, comprising:

generating a virtual circuit structure in response to a circuit design instruction of a user on a visual page;

converting the virtual circuit structure into a control signal conforming to a preset format condition;

decoding the control signal by using a decoding method matched with the preset format condition, and generating a circuit regulating signal according to a decoding result; and transmitting the circuit regulating signal to generate a physical circuit structure for performing a simulation verification operation by adjusting a connection relationship between components and nodes in a physical circuit generator with circuit components integrated therein based on the circuit regulating signal.

2. The chip circuit simulation verification method according to claim 1, wherein the step of generating the virtual circuit structure in response to the circuit design instruction of the user on the visual page comprises:

creating a plurality of virtual components in the visual page in advance;

setting a component storage region in the visual page in advance and creating a component list in the component storage region to input each virtual component into the component list and set unique identification information for each virtual component at the same time;

in response to a component dragging instruction, dragging a target virtual component corresponding to the component dragging instruction from a storage location to a target location of the visual page; and connecting, in response to a connection relationship setting instruction, the corresponding virtual component to be connected according to the connection relationship instructed in the connection relationship setting instruction.

3. The chip circuit simulation verification method according to claim 1, wherein the step of converting the virtual circuit structure into the control signal conforming to the preset format condition comprises:

obtaining parameter information of each component in the virtual circuit structure;

generating a component connection relationship table based on the parameter information, a total number of nodes of the virtual circuit structure, and a connection relationship between pins of each component and nodes in the virtual circuit structure; and generating the control signal based on the component connection relationship table and a currently-used transmission protocol;

accordingly, the process of decoding the control signal by using the decoding method matched with the preset format condition comprises:

parsing the control signal to obtain the component connection relationship table; and taking the component connection relationship table as the decoding result.

4. The chip circuit simulation verification method according to any one of claim 1, wherein the physical circuit generator has a physical circuit grid integrated therein, the physical circuit grid comprises various components and a plurality of nodes of a circuit, grid lines thereof are pin lines of the components or connection lines of the nodes, and grid intersections thereof are intersections of the pin lines of the components and the connection lines of the nodes; a non-volatile storage unit is pre-deployed on each grid intersection of the physical circuit grid, the physical circuit grid comprises a plurality of lead-out pins having the same number as the nodes and having a one-to-one correspondence with the nodes, and wherein the step of generating the circuit regulating signal according to the decoding result comprises:

obtaining information of components comprised in the virtual circuit structure, information of nodes comprised in the virtual circuit structure, and the connection relationship between the pins of each component and the nodes according to the decoding result;

generating a circuit grid control graph corresponding to the physical circuit grid based on the information of components, the information of nodes, and the connection relationship; and generating the circuit regulating signal according to intersections in the circuit grid control graph, so as to control whether a target transistor of the non-volatile storage unit deployed on each grid intersection of the physical circuit grid is to be set in an on-state or an off-state; the target transistor being a transistor connected to a pin of a component and a node of the physical circuit grid.

5. A chip circuit simulation verification system, comprising a host computer, a physical circuit generator, and a simulation verifier; wherein the host computer is configured to implement the steps of the chip circuit simulation verification method according to claim 1 when executing a computer program stored in a storage unit;

the physical circuit generator has various circuit components integrated therein for generating a corresponding physical circuit structure based on a circuit regulating signal output by the host computer; and the simulation verifier is configured to perform simulation verification on the physical circuit structure and output a simulation verification result.

6. The chip circuit simulation verification system according to claim 5, wherein the physical circuit generator has a physical circuit grid integrated therein;

the physical circuit grid is of a grid shape comprising various components and a plurality of nodes of a circuit, grid lines of the physical circuit grid are pin lines of the components or connection lines of the nodes, and grid intersections thereof are intersections of the pin lines of the components and the connection lines of the nodes; a non-volatile storage unit is deployed on each grid intersection of the physical circuit grid, and the physical circuit grid comprises a plurality of lead-out pins having the same number as the nodes and having a one-to-one correspondence with the nodes.

7. The chip circuit simulation verification system according to claim 6, wherein the non-volatile storage unit comprises a first transistor, a second transistor and a third transistor;

the first transistor is connected to a tunneling electrode;

the second transistor is connected to a control electrode;

gate electrodes of the first transistor, the second transistor and the third transistor are all connected to a floating gate electrode;

source electrodes and drain electrodes of the first transistor and the second transistor are connected to a substrate;

the gate electrode and source electrode of the third transistor are not interconnected, and the gate electrode and source electrode of the third transistor are connected to each grid intersection.

8. The chip circuit simulation verification system according to claim 7, wherein the third transistor is a P-LDMOS transistor or an N-JFET transistor;

when the third transistor is a P-LDMOS transistor:

if it is determined that the third transistor of a present non-volatile storage unit deployed on a present grid intersection of the physical circuit grid is to be set in an on-state according to the circuit regulating signal, the physical circuit generator connects the control electrode of the present non-volatile storage unit to a high voltage VP terminal, and connects the tunneling electrode of the present non-volatile storage unit to a 0V terminal;

if it is determined that the third transistor of the present non-volatile storage unit is to be set in an off-state according to the circuit adjusting signal, the physical circuit generator connects the tunneling electrode of the present non-volatile storage unit to the high voltage VP terminal, and connects the control electrode of the present non-volatile storage unit to the 0V terminal; and when the third transistor is an N-JFET transistor:

if it is determined that the third transistor of the present non-volatile storage unit deployed on the present grid intersection of the physical circuit grid is to be set in an on-state according to the circuit regulating signal, the physical circuit generator connects the tunneling electrode of the present non-volatile storage unit to a high voltage VP terminal, and connects the control electrode of the present non-volatile storage unit to a 0V terminal;

if it is determined that the third transistor of the present non-volatile storage unit is to be set in an off-state according to the circuit adjusting signal, the physical circuit generator connects the control electrode of the present non-volatile storage unit to the high voltage VP terminal, and connects the tunneling electrode of the present non-volatile storage unit to the 0V terminal.

9. The chip circuit simulation verification system according to claim 8, wherein, after the physical circuit generator is disconnected from the host computer and powered down, an input terminal, an output terminal and a target device of the simulation verifier are connected to corresponding lead-out pins of the physical circuit generator.

10. The chip circuit simulation verification system according to claim 5, wherein multiple physical circuit generators are provided, the physical circuit generators are connected to each other by a module connection interface.

11. A chip circuit simulation verification apparatus, comprising:

a circuit diagram design module, configured to generate a virtual circuit structure in response to a circuit design instruction of a user on a visual page;

a control signal generating module, configured to convert the virtual circuit structure into a control signal conforming to a preset format condition;

a circuit regulating signal generating module, configured to decode the control signal by using a decoding method matched with the preset format condition, and generate a circuit regulating signal according to a decoding result; and a physical circuit generation and simulation module, configured to transmit the circuit regulating signal to generate a physical circuit structure for performing a simulation verification operation by adjusting a connection relationship between components and nodes in a physical circuit generator with circuit components integrated therein based on the circuit regulating signal.

12. The chip circuit simulation verification apparatus according to claim 11, wherein the circuit diagram design module is configured to:

create a plurality of virtual components in the visual page in advance;

set a component storage region in the visual page in advance and create a component list in the component storage region to input each virtual component into the component list and set unique identification information for each virtual component at the same time;

in response to a component dragging instruction, drag a target virtual component corresponding to the component dragging instruction from a storage location to a target location of the visual page; and connect, in response to a connection relationship setting instruction, the corresponding virtual component to be connected according to the connection relationship instructed in the connection relationship setting instruction.

13. The chip circuit simulation verification apparatus according to claim 11, wherein the control signal generating module is configured to:

obtain parameter information of each component in the virtual circuit structure;

generate a component connection relationship table based on the parameter information, a total number of nodes of the virtual circuit structure, and a connection relationship between pins of each component and nodes in the virtual circuit structure; and generate the control signal based on the component connection relationship table and a currently-used transmission protocol; and the circuit regulating signal generating module is configured to:

parse the control signal to obtain the component connection relationship table; and take the component connection relationship table as the decoding result.

14. The chip circuit simulation verification apparatus according to claim 11, wherein the physical circuit generator has a physical circuit grid integrated therein, the physical circuit grid comprises various components and a plurality of nodes of a circuit, grid lines thereof are pin lines of the components or connection lines of the nodes, and grid intersections thereof are intersections of the pin lines of the components and the connection lines of the nodes;

a non-volatile storage unit is pre-deployed on each grid intersection of the physical circuit grid, the physical circuit grid comprises a plurality of lead-out pins having the same number as the nodes and having a one-to-one correspondence with the nodes;

the circuit regulating signal generating module is configured to:

obtain information of components comprised in the virtual circuit structure, information of nodes comprised in the virtual circuit structure, and the connection relationship between the pins of each component and the nodes according to the decoding result;

generate a circuit grid control graph corresponding to the physical circuit grid based on the information of components, the information of nodes, and the connection relationship; and generate the circuit regulating signal according to intersections in the circuit grid control graph so as to control whether a target transistor of the non-volatile storage unit deployed on each grid intersection of the physical circuit grid is to be set in an on-state or an off-state;

the target transistor being a transistor connected to a pin of a component and a node of the physical circuit grid.

* * * * *